(12) United States Patent
Kim et al.

(10) Patent No.: US 10,311,335 B1
(45) Date of Patent: Jun. 4, 2019

(54) METHOD AND DEVICE FOR GENERATING IMAGE DATA SET TO BE USED FOR LEARNING CNN CAPABLE OF DETECTING OBSTRUCTION IN AUTONOMOUS DRIVING CIRCUMSTANCE, AND TESTING METHOD, AND TESTING DEVICE USING THE SAME (71) Applicant: STRADVISION, INC., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

( * ) Notice: Subject to any disclaimer, the term of this patent is extended or adjusted under 35 U.S.C. 154(b) by 0 days.

(21) Appl. No.: 16/121,635

(22) Filed: Sep. 5, 2018

(51) Int. Cl.
G06K 9/62 (2006.01)
G06K 9/00 (2006.01)
G05D 1/00 (2006.01)
G06N 3/08 (2006.01)
G06N 3/04 (2006.01)

(52) U.S. Cl.
CPC ......... *G06K 9/6257* (2013.01); *G05D 1/0088* (2013.01); *G06K 9/00805* (2013.01); *G06N 3/0454* (2013.01); *G06N 3/084* (2013.01); *G05D 2201/0213* (2013.01)

(58) Field of Classification Search
CPC ..... G06T 7/11; G06T 7/13; G06T 7/90; G06T 5/001; G06T 5/006
See application file for complete search history.

(56) References Cited

PUBLICATIONS

Tian, et al: "DeepTest: Automated Testing of Deep-Neural-Network-driven Autonomous Cars", 2018.*
Lu et al: "No Need to Worry about Adversarial Examples in Object Detection in Autonomous Vehicles", 2017.*

* cited by examiner

*Primary Examiner* — Ruiping Li
(74) *Attorney, Agent, or Firm* — Xsensus LLP (57) ABSTRACT A method of generating at least one image data set to be used for learning CNN capable of detecting at least one obstruction in one or more autonomous driving circumstances, comprising steps of: (a) a learning device acquiring (i) an original image representing a road driving circumstance and (ii) a synthesized label obtained by using an original label corresponding to the original image and an additional label corresponding to an arbitrary specific object, wherein the arbitrary specific object does not relate to the original image; and (b) the learning device supporting a first CNN module to generate a synthesized image using the original image and the synthesized label, wherein the synthesized image is created by combining (i) an image of the arbitrary specific object corresponding to the additional label and (ii) the original image.

28 Claims, 5 Drawing Sheets

METHOD AND DEVICE FOR GENERATING IMAGE DATA SET TO BE USED FOR LEARNING CNN CAPABLE OF DETECTING OBSTRUCTION IN AUTONOMOUS DRIVING CIRCUMSTANCE, AND TESTING METHOD, AND TESTING DEVICE USING THE SAME

FIELD OF THE INVENTION

The present invention relates to a method and a device for generating at least one image data set to be used for learning CNN capable of detecting at least one obstruction in one or more autonomous driving circumstances and a testing method and a testing device using the same; and more particularly, to the method for generating at least one image data set to be used for learning CNN including steps of: (a) acquiring (i) an original image representing a road driving circumstance and (ii) a synthesized label obtained by using an original label corresponding to the original image and an additional label corresponding to an arbitrary specific object, wherein the arbitrary specific object does not relate to the original image; and (b) supporting a first CNN module to generate a synthesized image using the original image and the synthesized label, wherein the synthesized image is created by combining (i) an image of the arbitrary specific object corresponding to the additional label and (ii) the original image, and the learning device, the testing method, and the testing device using the same.

BACKGROUND OF THE INVENTION

Deep Convolution Neural Networks, or Deep CNN is the most core of the remarkable development in the field of Deep Learning. Though the CNN has been employed to solve character recognition problems in 1990s, it is not until recently that the CNN has become widespread in Machine Learning. For example, in 2012, the CNN significantly outperformed its competitors in an annual software contest, the ImageNet Large Scale Visual Recognition Challenge, and won the contest. After that, the CNN has become a very useful tool in the field of machine learning.

Meanwhile, image segmentation is a method of generating a label image using an input image, e.g., a training image, a test image. Recently, the Deep Learning has been so much widespread that the Deep Learning is being applied to the image segmentation.

By the way, when learning CNNs to detect obstructions in autonomous driving circumstances, a learning device has to learn a variety of objects which may be faced in the autonomous driving circumstances. And for this, training images should include a variety of objects which may be faced in the autonomous driving circumstances.

In a real driving circumstances, there may be variety of objects on the road, but it is not easy to collect these data. In other words, training images including unique objects which appears hardly in the road may not be collected easily from normal driving video data. For example, images of human, bicycles, or cars may be acquired easily from the normal driving video data so that the learning device may learn parameters of CNN by using training images with these common objects, but images of a tiger, or alligator may not be acquired easily from the normal driving video data so that the learning device may have difficulty in learning the parameters of CNN by using training images with these unique objects.

SUMMARY OF THE INVENTION

It is an object of the present invention to solve all problems explained above.

It is another object of the present invention to provide a method for generating training image sets to be used for increasing a performance of detecting objects which may not be faced often in a real driving situation in autonomous driving circumstances.

It is still another object of the present invention to provide a method for generating synthesized images more similar to real images, and a method for generating data sets to be used for learning parameters of CNN by including various information in the synthesized image such as information on bounding boxes to fee used in later learning autonomous driving.

In accordance with one aspect of the present invention, there is provided a method of generating at least one image data set, to be used for learning CNN capable of detecting at least one obstruction in one or more autonomous driving circumstances, including steps of: (a) a learning device acquiring (i) an original image representing a road driving circumstance and (ii) a synthesized label obtained by using an original label corresponding to the original image and an additional label corresponding to an arbitrary specific object, wherein the arbitrary specific object does not relate to the original image; and (b) the learning device supporting a first CNN module to generate a synthesized image using the original image and the synthesized label, wherein the synthesized image is created by combining (i) an image of the arbitrary specific object corresponding to the additional label and (ii) the original image.

As one example, the method further includes steps of: (c) the learning device supporting a second CNN module to acquire the synthesized image and to generate a first output value which represents a probability as to whether the synthesized image is fake or real, and further supporting the second CNN module to acquire an arbitrary real image which has not been synthesized, and to generate a second output value which represents a probability as to whether the arbitrary real image is fake or real; (d) the learning device supporting the second CNN module to generate a first loss value by comparing the first output value to a first GT value, and a second loss value by comparing the second output value to a second GT value, and supporting the first and the second CNN modules to be learned by backpropagating each of the first and the second loss values through the second CNN module and the first CNN module.

As one example, at the step of (d), the learning device supports the first CNN module to learn parameters thereof such that a degree of making the second CNN module judge the synthesized image as real image is increased, and the second CNN module to learn parameters thereof such that a degree of correctly judging each of the arbitrary real image and synthesized image is whether real or fake is increased.

As one example, at the step of (a), the learning device further acquires (iii) at least the value of the random seed, wherein, at the step of (b), the learning device supports the first CNN module to generate one or more adjusted synthesized images using the original image, the synthesized label and the value of the random seed, and wherein each of the adjusted synthesized images is derived from the synthesized image such that at least part of a size, a location, and a color of the specific object in each of the adjusted synthesized Images are adjusted from those of the specific object in the synthesized image while changing the value of the random seed.

As one example, the first CNN module includes: an encoding layer for generating a feature map by applying one or more convolution operations to the original image and the synthesized label, an adjusting layer for generating an adjusted feature map by using the feature map and the value of the random seed, and a decoding layer for generating the synthesized image by applying one or more deconvolution operations to the adjusted feature map.

As one example, at the step of (a), at the time when the original image and the synthesized label are acquired, the learning device further acquires (i) information on one or more first bounding boxes corresponding to one or more objects included in the original image and (ii) information on a second bounding box corresponding to the specific object included in the synthesized label, wherein, at the step of (b), the learning device further generates third bounding boxes on the synthesized image by using the information on the first and the second bounding boxes, and wherein the third bounding boxes include at least one of boxes corresponding to (i) at least one of the multiple objects in the original image and (ii) the specific object in the synthesized label, or adjusted boxes that have been slightly resized or relocated based on the boxes corresponding to (i) and (ii).

As one example, the second bounding box is generated by using minimum axis parallel rectangle.

As one example, at the step of (a), after a type of the specific object is selected among a plurality of data sets, the additional label is generated by sampling multiple masks corresponding to the type of the specific object.

As one example, the method further includes a step of: (e) the learning device adding the synthesized image and the synthesized label into a database including training data sets for one of object detection and image segmentation.

In accordance with another aspect of the present invention, there is provided a test method of generating at least one image data set to be used for detecting at least one obstruction in one or more autonomous driving circumstances, including: (a) a testing device, on condition that (I) a learning device has acquired (i) an original image for training representing a road driving circumstance and (ii) a synthesized label for training obtained by using an original label for training corresponding to the original image for training and an additional label for training corresponding to an arbitrary specific object for training, wherein the arbitrary specific object for training does not relate to the original image for training; (II) the learning device has supported a first CNN module to generate a synthesized image for training using the original image for training and the synthesized label for training, wherein the synthesized image for training is created by combining (i) an image of the arbitrary specific object for training corresponding to the additional label for training and (ii) the original image for training, (III) the learning device has supported, a second CNN module to acquire the synthesized image for training and to generate a first output value which represents a probability as to whether the synthesized image for training is fake or real, and further has supported the second CNN module to acquire an arbitrary real image which has not been synthesized, and to generate a second output value which represents a probability as to whether the arbitrary real image is fake or real; and (IV) the learning device has supported the second CNN module to generate a first loss value by comparing the first output value to a first GT value, and a second loss value by comparing the second output value to a second GT value, and has supported the first and the second CNN modules to be learned by backpropagating each of the first and the second loss values through the second CNN module and the first CNN module, acquiring (i) an original image for testing representing a road driving circumstance and (ii) a synthesized label for testing obtained by using an original label for testing corresponding to the original image for testing and an additional label for testing corresponding to an arbitrary specific object for testing, wherein the arbitrary specific object for testing does not relate to the original image for testing; and (b) the testing device supporting the first CNN module to generate a synthesized image for testing using the original image for testing and the synthesized label for testing, wherein the synthesized image for testing is created by combining (i) an image of the arbitrary specific object for testing corresponding to the additional label for testing and (ii) the original image for testing.

As one example, at the step of (a), the testing device further acquires (iii) at least the value of the random seed for testing, wherein, at the step of (b), the testing device supports the first CNN module to generate one or more adjusted synthesized images for testing using the original image for testing, the synthesized label for testing and the value of the random seed for testing, and wherein each of the adjusted synthesized images for testing is derived from the synthesized image for testing such that at least part of a size, a location, and a color of the specific object for testing in each of the adjusted synthesized images for testing are adjusted from those of the specific object for testing in the synthesized image for testing while changing the value of the random seed for testing As one example, the first CNN module includes: an encoding layer for generating a feature map for testing by applying one or more convolution operations to the original image for testing and the synthesized label for testing, an adjusting layer for generating an adjusted feature map for testing by using the feature map for testing and the value of the random seed for testing, and a decoding layer for generating the synthesized image for testing by applying one or more deconvolution operations to the adjusted feature map for testing.

As one example, at the step of (a), at the time when the original image for testing and the synthesized label for testing are acquired, the testing device further acquires (i) information on one or more first bounding boxes for testing corresponding to one or more objects included in the original image for testing and (ii) information on a second bounding box for testing corresponding to the specific object for testing included in the synthesized label for testing, wherein, at the step of (b), the learning device further generates third bounding boxes for testing on the synthesized image for testing by using the information on the first and the second bounding boxes for testing, and wherein the third bounding boxes for testing include at least one of boxes corresponding to (i) at least one of the multiple objects in the original image for testing and (ii) the specific object for testing in the synthesized label for testing, or adjusted boxes for testing that have been slightly resized or relocated based on the boxes corresponding to (i) and (ii).

As one example, the second bounding box for testing is generated by using minimum axis parallel rectangle.

As one example, at the step of (a), after a type of the specific object for testing is selected among a plurality of data sets, the additional label for testing is generated by sampling multiple masks corresponding to the type of the specific object for training.

In accordance with still another aspect of the present invention, there is provided a device of generating at least one image data set to be used for learning CNN capable of detecting at least one obstruction in one or more autonomous driving circumstances, including: a communication part for acquiring (i) an original image representing a road driving circumstance and (ii) a synthesized label obtained by using an original label corresponding to the original image and an additional label corresponding to an arbitrary specific object, wherein the arbitrary specific object does not relate to the original image; and a processor for performing a process of (I) supporting a first CNN module to generate a synthesized image using the original image and the synthesized label, wherein the synthesized image is created by combining (i) an image of the arbitrary specific object corresponding to the additional label and (ii) the original image.

As one example, the processor further performs processes of (II) supporting a second CNN module to acquire the synthesized image and to generate a first output value which represents a probability as to whether the synthesized image is fake or real, and supporting the second CNN module to acquire an arbitrary real image which has not been synthesized, and to generate a second output value which represents a probability as to whether the arbitrary real image is fake or real; (III) supporting the second CNN module to generate a first loss value by comparing the first output value to a first GT value, and a second loss value by comparing the second output value to a second GT value, and supporting the first and the second CNN modules to be learned by backpropagating each of the first and the second loss values through the second CNN module and the first CNN module.

As one example, at the process of (III), the processor supports the first CNN module to learn parameters thereof such that a degree of making the second CNN module judge the synthesized image as real image is increased, and the processor supports the second CNN module to learn parameters thereof such that a degree of correctly judging each of the arbitrary real image and synthesized image is whether real or fake is increased As one example, the communication part further acquires (iii) at least the value of the random seed, and, at the process of (I), the processor supports the first CNN module to generate one or more adjusted synthesized images using the original image, the synthesized label and the value of the random seed, and wherein each of the adjusted synthesized images is derived from the synthesized image such that at least part of a size, a location, and a color of the specific object in each of the adjusted synthesized images are adjusted from those of the specific object in the synthesized image while changing the value of the random seed.

As one example, the first CNN module includes: an encoding layer for generating a feature map by applying one or more convolution operations to the original image and the synthesized label, an adjusting layer for generating an adjusted feature map by using the feature map and the value of the random seed, and a decoding layer for generating the synthesized image by applying one or more deconvolution operations to the adjusted feature map.

As one example, at the time when the original image and the synthesized label are acquired, the communication part further acquires (i) information on one or more first bounding boxes corresponding to one or more objects included in the original image and (ii) information on a second bounding box corresponding to the specific object included in the synthesized label, and, at the process of (I), the processor further generates third bounding boxes on the synthesized image by using the information on the first and the second bounding boxes, and wherein the third bounding boxes include at least one of boxes corresponding to (i) at least one of the multiple objects in the original image arid (ii) the specific object in the synthesized label, or adjusted boxes that have been slightly resized or relocated based on the boxes corresponding to (i) and (ii).

As one example, the device, wherein the second bounding box is generated by using minimum axis parallel rectangle.

As one example, after a type of the specific object is selected among a plurality of data sets, the additional label is generated by sampling multiple masks corresponding to the type of the specific object.

As one example, the processor further performs a process of: (IV) adding the synthesized image and the synthesized label into a database including training data sets for one of object detection and image segmentation.

In accordance with still yet another aspect of the present invention, there is provided a test device of generating at least one image data set to be used for detecting at least one obstruction in one or more autonomous driving circumstances, including: a communication part, on condition that (I) a learning device has acquired (i) an original image for training representing a road driving circumstance and (ii) a synthesized label for training obtained by using an original label for training corresponding to the original image for training and an additional label for training corresponding to an arbitrary specific object for training, wherein the arbitrary specific object for training does not relate to the original image for training; (II) the learning device has supported a first CNN module to generate a synthesized image for training using the original image for training and the synthesized label for training, wherein the synthesized image for training is created by combining (i) an image of the arbitrary specific object for training corresponding to the additional label for training and (ii) the original image for training, (III) the learning device has supported, a second CNN module to acquire the synthesized image for training and to generate a first output value which represents a probability as to whether the synthesized image for training is fake or real, and further has supported the second CNN module to acquire an arbitrary real image which has not been synthesized, and to generate a second output value which represents a probability as to whether the arbitrary real image is fake or real; and (IV) the learning device has supported the second CNN module to generate a first loss value by comparing the first output value to a first GT value, and a second loss value by comparing the second output value to a second GT value, and has supported the first and the second CNN modules to be learned by backpropagating each of the first and the second loss values through the second CNN module and the first CNN module, for acquiring (i) an original image for testing representing a road driving circumstance and (ii) a synthesized label for testing obtained by using an original label for testing corresponding to the original image for testing and an additional label for testing corresponding to an arbitrary specific object for testing, wherein the arbitrary specific object for testing does not relate to the original image for testing; and a processor for performing a process of (I) supporting the first CNN module to generate a synthesized image for testing using the original image for testing and the synthesized label for testing, wherein the synthesized image for testing is created by combining (i) an image of the arbitrary specific object for testing corresponding to the additional label for testing and (ii) the original image for testing.

As one example, the communication part further acquires (iii) at least the value of the random seed for testing, wherein, at the process of (I), supports the first CNN module to generate one or more adjusted synthesized images for testing using the original image for testing, the synthesized label for testing and the value of the random seed for testing, and wherein each of the adjusted synthesized images for testing is derived from the synthesized image for testing such that at least part of a size, a location, and a color of the specific object for testing in each of the adjusted synthesized images for testing are adjusted from those of the specific object for testing in the synthesized image for testing while changing the value of the random seed for testing.

As one example, the first CNN module includes: an encoding layer for generating a feature map for testing by applying one or more convolution operations to the original image for testing and the synthesized label for testing, an adjusting layer for generating an adjusted feature map for testing by using the feature map for testing and the value of the random seed for testing, and a decoding layer for generating the synthesized image for testing by applying one or more deconvolution operations to the adjusted feature map for testing.

As one example, at the time when the original image for testing and the synthesized label for testing are acquired, the communication part further acquires (i) information on one or more first bounding boxes for testing corresponding to one or more objects included in the original image for testing and (ii) information on a second bounding box for testing corresponding to the specific object for testing included in the synthesized label for testing, wherein, at the process of (I), the learning device further generates third bounding boxes for testing on the synthesized image for testing by using the information on the first and the second bounding boxes for testing, and wherein the third bounding boxes for testing include at least one of boxes corresponding to (i) at least one of the multiple objects in the original image for testing and (ii) the specific object for testing in the synthesized label for testing, or adjusted boxes for testing that have been slightly resized or relocated based on the boxes corresponding to (i) and (ii).

As one example, the second bounding box for testing is generated by using minimum axis parallel rectangle.

As one example, after a type of the specific object for testing is selected among a plurality of data sets, the additional label for testing is generated by sampling multiple masks corresponding to the type of the specific object for training.

BRIEF DESCRIPTION OF THE DRAWINGS

The drawings attached below to explain example embodiments of the present invention are only part of example embodiments of the present invention and other drawings may be obtained based on the drawings without inventive work for those skilled in the art.

DETAILED DESCRIPTION OF THE PREFERRED EMBODIMENTS

Detailed explanations of the present invention explained below refer to attached drawings that illustrate specific embodiment examples of this present that may be executed. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To make those skilled in the art embody the present invention easily, desirable example embodiments of the present invention will be explained more specifically by referring to drawings attached.

Figure 1:
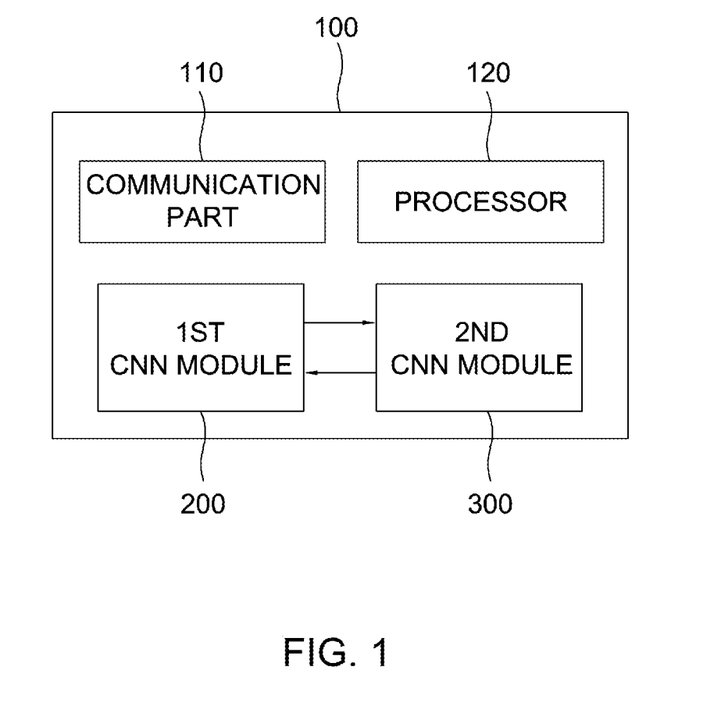
FIG. 1 shows a hardware configuration of the learning device in accordance with the present invention.

FIG. 1 shows a configuration of a learning device in accordance with the present invention.

Referring to FIG. 1, the learning device 100 may include a first CNN module 200 and a second CNN module 300. Functions of inputting and outputting various data and those of operating various data by the first CNN module 200 and the second CNN module 300 may be performed by a communication part 110 and a processor 120 therein respectively. But, in FIG. 1, specific information on how the communication part 110 and the processor 120 are connected is omitted.

Figure 4:
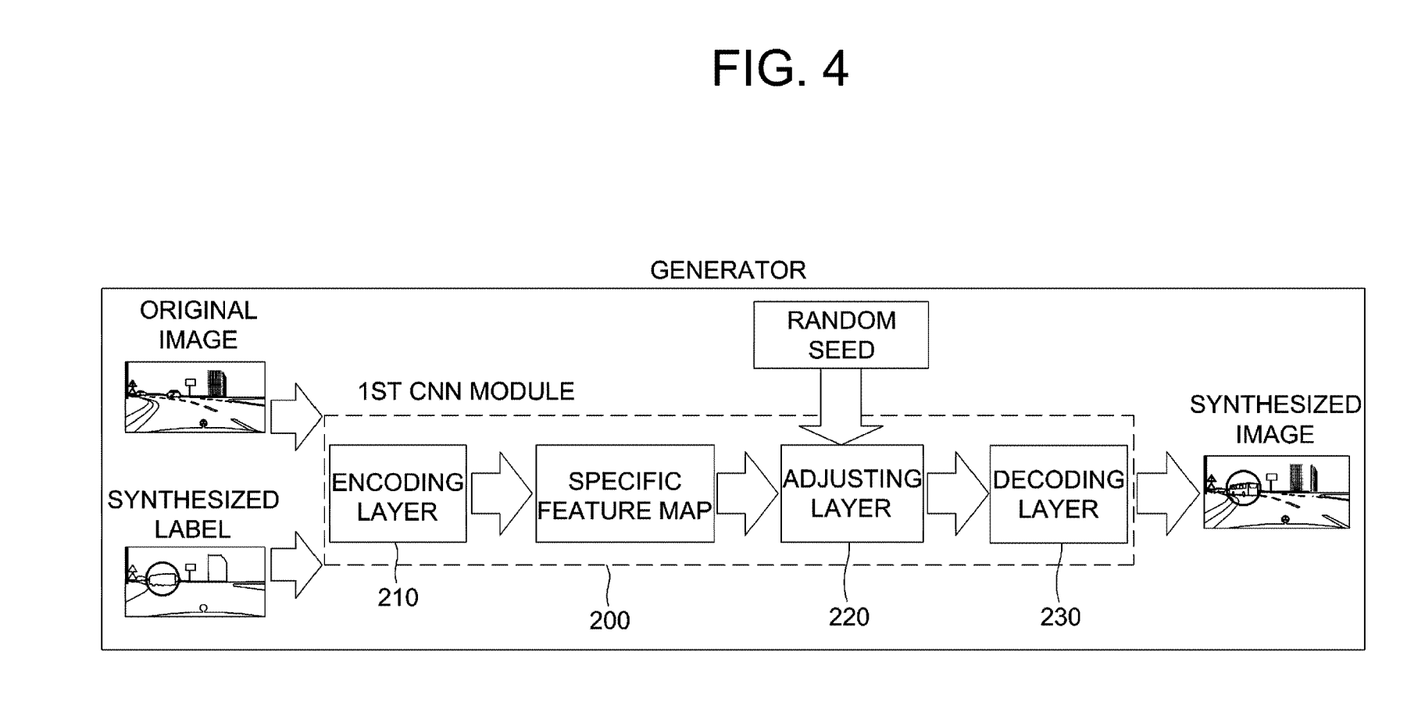
FIG. 4 shows how the first CNN module applies various operations to its inputs when the first CNN module functions as a testing device.

The first CNN module 200 shown in FIG. 1 is explained in detail by referring to FIG. 4.

Referring to FIG. 4, the first CNN module 200 may include an encoding layer 210, an adjusting layer 220, and a decoding layer 230.

Specifically, the encoding layer 210 may perform a process of generating feature maps by applying one or more convolution operations to an original image and a synthesized label. The adjusting layer 220 may perform a process of generating an adjusted feature map by using a specific feature map finally outputted from the encoding layer and a value of a random seed. The decoding layer 230 may perform a process of generating a synthesized image by applying one or more deconvolution operations to the adjusted feature map.

Explaining the convolution operations performed in the encoding layer in detail, the encoding layer 210 acquires the original image and the synthesized label to generate the feature maps. After concatenating the original image and the synthesized label channel-wise, which are 3-channel and 1-channel data respectively, the encoding layer 210 may apply the convolution operation to concatenated 4-channel data.

Meanwhile, the second CNN module 300 may be configured similarly to the first CNN module 200, so that detailed explanation thereon is skipped. But, as the second CNN module performs a unique process of the present invention by being coupled with the first CNN module, it will be explained later in detail.

Figure 2:
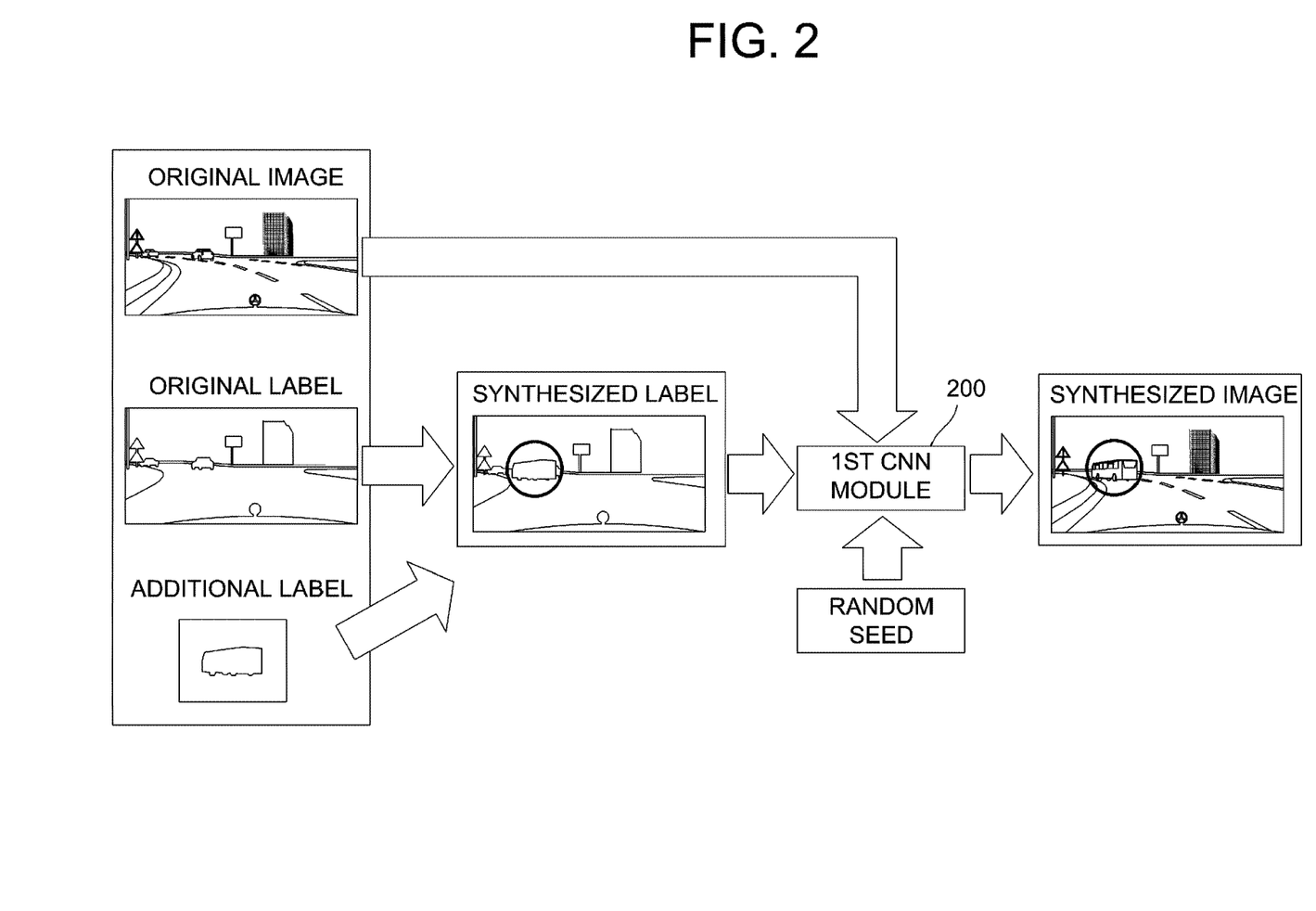
FIG. 2 shows a process of a first CNN module generating an image data set for training in accordance with one example embodiment of the present invention.

Referring to FIG. 2, how the learning device 100 generates training data sets will be explained.

FIG. 2 shows a process of the first CNN module generating a training data set in the present invention.

Referring to FIG. 2, the learning device 100 may allow the communication part 110 to acquire (i) the original image representing a road driving circumstance and (ii) the synthesized label. The synthesized label is generated by using an original label corresponding to the original image and an additional label corresponding to an arbitrary specific object. Herein, the specific arbitrary object does not relate to the original image.

When the learning device 100 acquires the original image and the synthesized label, the learning device 100 supports the first CNN module 200 to generate the synthesized image by using the original image and the synthesized label.

Herein, the synthesized image is created by combining (i) an image of the specific object corresponding to the additional label and (ii) the original image. For example, referring to FIG. 2, it can be seen that an image of a bus corresponding to the additional label is combined with the original image. The process of generating the synthesized image may be performed by the processor 120.

For example, referring to FIG. 2, when (i) the original image, (ii) the original label corresponding to the original image including a road and (iii) the additional label corresponding to a big-sized bus(objects which may exist on the road but hard to see, for example a cow or fallen rocks, may be applicable) are acquired, the synthesized label may be generated by combining the original label and the additional label corresponding to the big-sized bus. After that, the first CNN module generates the synthesized image by combining an image of the big-sized bus with the original image such that the image of the big-sized bus is located at a location on the road in the original image.

Herein, the learning device 100 may acquire the synthesized label after the learning device 100 generates the synthesized label or after another module (not described) coupled with the learning device 100 generates the synthesized label and then delivers the synthesized label to the learning device. In the former case, the original label and the additional label may be inputted to the learning device 100.

Meanwhile, image synthesizing techniques well known to these skilled in the art may be used to generate the training data sets. Specifically, when the additional label is combined with the synthesized label, an image corresponding to the additional label may be combined at a location in the original image corresponding to a location of combining the additional label in the synthesized label.

Figure 3:
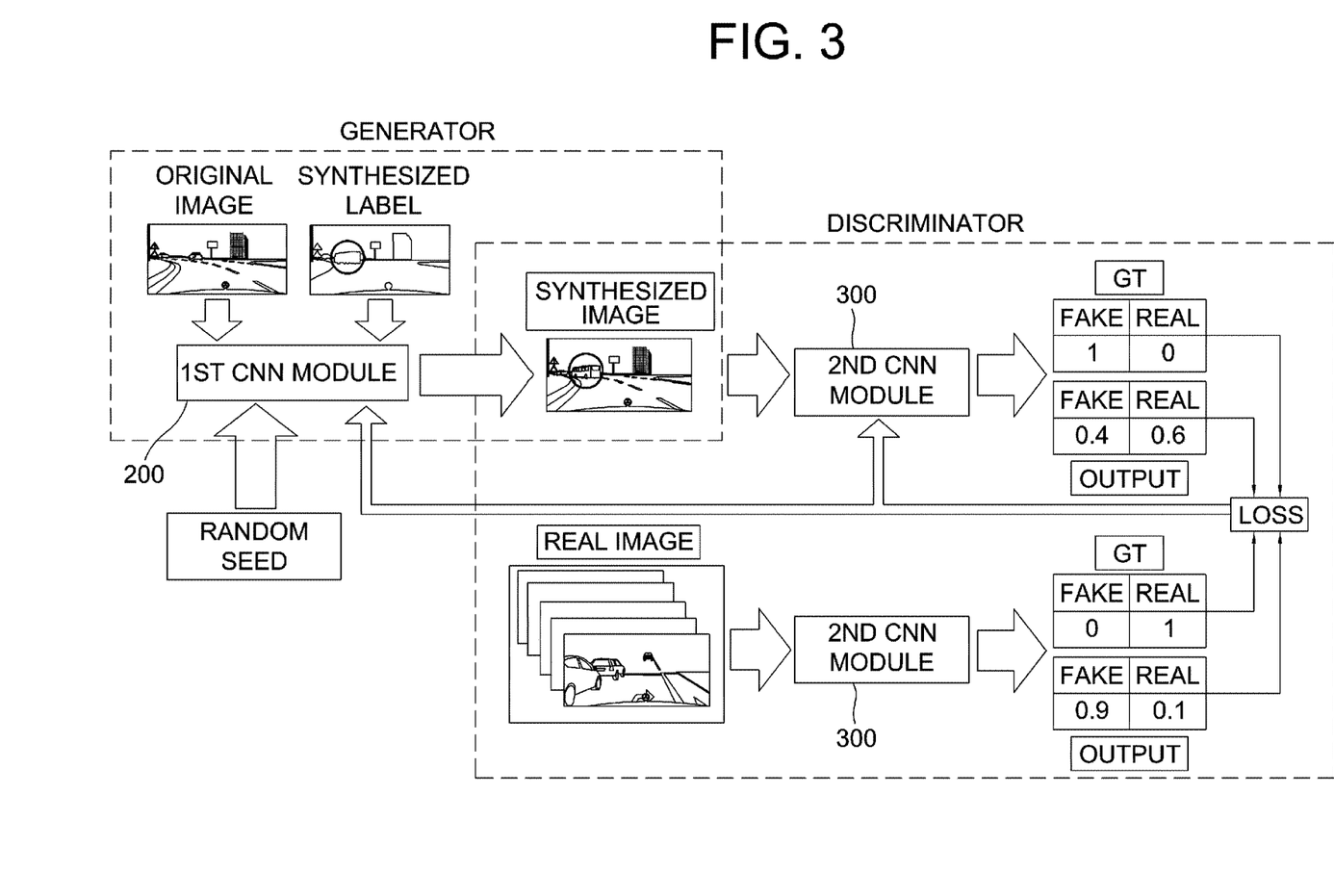
FIG. 3 shows a process of the first CNN module learning how to generate the image data set for training adversarially with a second CNN module.

In FIG. 2, FIG. 3, and FIG. 4, there are circles in the synthesized label and the synthesized image. The circles are just shown to emphasize that the additional label and the image of bus are added on the synthesized label and the synthesized image, respectively. That is, the circles per se are not included in the synthesized label or synthesized image.

In FIG. 2, it is shown as if the first CNN module should acquire the value of the random seed to generate the synthesized image, but the value of the random seed is not an essential input in the present invention. Herein, a "seed" is a kind of input of a function, and if a value of the seed is fixed, at least one characteristic of an output of the function gets fixed. Thus, the value of the random seed continuously changes and it is used to make the output of the function various. How the random seed is used will be explained later in detail.

Meanwhile, if the synthesized image is generated as mentioned above, a combined state of the original image and the image corresponding to the additional label may be unnatural. So additional learning processes may be performed. It will be explained by referring to FIG. 3.

FIG. 3 shows processes of the first and the second CNN modules learning adversarially, coupled with each other.

Referring to FIG. 3, the learning device 100 supports the first CNN module 200 to deliver the outputted synthesized image to the second CNN module, and supports the second CNN module to generate a first output value which represents the inputted synthesized image is whether real or fake. Also, the learning device 100 supports the second CNN module to acquire an arbitrary real image, and supports the second CNN module to generate a second output value which represents the inputted real image is real or fake.

And the learning device 100 supports the second CNN module to generate a first less value by comparing the first output value to a first GT value, a second loss value by comparing the second output value to a second GT value, and supports the first and the second CNN modules to be learned by backpropagating each of the first and the second loss values through the second CNN module and the first CNN module.

This is based on the Generative Adversarial Network (GAN) theory. In detail, the first CNN module functions as a so-called generator, and the second CNN module as a so-called discriminator. Specifically, the first CNN module learns parameters thereof such that a degree of deceivability, i.e., a degree of making the second CNN module judge the synthesized image as real image, is increased. The second CNN module learns parameters thereof such that a degree of discernibility, i.e., a degree of correctly judging each of the arbitrary real image and synthesized image is whether real or fake, is increased.

As these processes are performed adversarially, the second CNN module finally reaches to a state of not being able to tell whether the inputted images, i.e., the arbitrary real image and synthesized image, are real or fake, and then the learning process is over.

However, if the learning process is performed as mentioned above, only synthesized images with a fixed characteristic may be generated. So, again referring to FIG. 2, as said above, the first CNN module 200 further acquires the value of the random seed, and the learning device 100 may support the first CNN module 200 to generate a plurality of the synthesized images by using the original image, the synthesized label, and the value of the random seed.

For example, if the first CNN module does not additionally acquire a value of the random seed or acquires a value of a fixed seed, it may only generate simply the synthesized image combined with the image of the big-sized bus whose characteristic is constant so that it cannot reflect various cases needed for learning. To prevent this shortcoming, the value of the random seed varying continuously are additionally inputted. Accordingly, various synthesized images are generated such that at least one of a color, a shape, and a location of the bus varies in the synthesized images.

Meanwhile, the first CNN module may generate the synthesized images with information on the bounding boxes being included therein. Since the present invention is aiming at the generation of various image sets to be used for learning the parameters of CNN under the autonomous driving circumstances, if the synthesized images with the information on the bounding boxes being included therein are generated, the first CNN module can learn the parameters of CNN more easily by using the information on the bounding boxes. It will be explained more specifically later.

FIG. 4 shows how the first CNN module applies various operations to its inputs when the first CNN module functions as a testing device.

Referring to FIG. 4, the testing device may include the first CNN module. The first CNN module 200, as said above, may include the encoding layer 210, the adjusting layer 220, and the decoding layer 230. This configuration is acquired by removing the second CNN module from the learning device in FIG. 3 after learning has been over.

This testing device will be able to generate the synthesized images with a variety of characteristics by changing the value of the random seed. In other words, more than one synthesized images may be used to learn the parameters of the CNN capable of performing process of object detection or semantic segmentation. Herein, the synthesized images are added to the training data sets. Meanwhile, the value of the random seed may not be essential in the testing device like the example of the learning device.

As mentioned above, the testing device may generate the synthesized image with the information on the bounding boxes being included therein in order to enhance an efficiency of learning processes of a CNN in an autonomous driving device.

Referring to FIG. 2, when the first CNN module acquires the original image and the synthesized label, it also acquires information on one or more first bounding boxes corresponding to at least one object in the original image and a second bounding box corresponding to the specific object. Thereafter, the first CNN module 200 additionally generates third bounding boxes on the synthesized image by using the information on the first and the second bounding boxes.

The second bounding box may be generated in many ways, specifically in a technique of Minimum Axis Parallel Rectangle. Herein, the technique of Minimum Axis Parallel Rectangle is a method for generating a bounding box for a target object by generating least area square on an image such that the least area square includes all points of the target object.

The third bounding boxes include at least one of boxes corresponding to (i) at least one of multiple objects in the original image and (ii) the specific object in the synthesized label, or adjusted boxes that have been slightly resized or relocated based on the boxes corresponding to (i) and (ii). This process may be understood by referring to FIG. 5.

Figure 5:
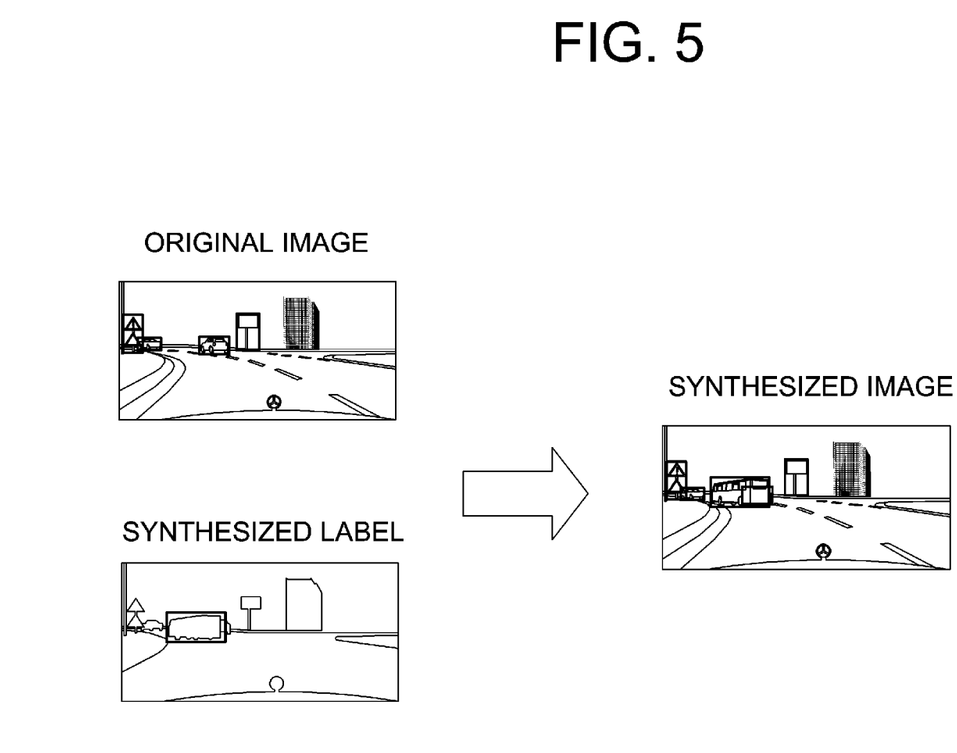
FIG. 5 shows an example process of acquiring information on bounding boxes in a synthesized image.

FIG. 5 shows an example process of acquiring information on bounding boxes in a synthesized image.

Referring to FIG. 5, not only bounding boxes existed on the original image but also a bounding box of the big-sized bus corresponding to the additional label are shown in the synthesized image.

As said above, information on the bounding boxes may be used for the learning of autonomous driving device, especially for the object detection. When detecting objects, a device should generate their corresponding bounding boxes, but in accordance with one example embodiment of the present invention, a time required for generating the bounding boxes may be dramatically reduced.

Also, the additional label may be generated in many ways. Specifically, after a type of the specific object is selected among a plurality of data sets, the additional label is generated by sampling multiple masks corresponding to the selected type of the specific object.

For example, if a cow is selected to learn, some of the preacquired masks of the cow may be used to generate a label corresponding to an image of the cow.

When the synthesized image and the synthesized label are generated, the synthesized image and the synthesized label may be added into a database including training data sets to be used for one of object detection and image segmentation.

The present invention has an effect of generating training image sets to be used for increasing a performance of detecting objects which may not be faced often in a real driving situation in autonomous driving circumstances.

The present invention has another effect of generating synthesized images more similar to real images, and generating data sets to be used for learning parameters of CNN by including various information in the synthesized image such as information, on bounding boxes to be used in later learning autonomous driving.

The objects of the technical solution of the present invention or parts contributing to the prior art can be implemented in a form of executable program command through a variety of computer means and can be recorded to computer readable recording media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a compiler but also a high-level code that can be used by an interpreter etc., which is executed by a computer. The aforementioned hardware devices can work as more than a software module to perform the action of the present invention and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A method of generating at least one image data set to be used for learning CNN capable of detecting at least one obstruction in one or more autonomous driving circumstances, comprising steps of:
   (a) a learning device acquiring (i) an original image representing a road driving circumstance and (ii) a synthesized label obtained by using an original label corresponding to the original image and an additional label corresponding to an arbitrary specific object, wherein the arbitrary specific object does not relate to the original image;
   (b) the learning device supporting a first CNN module to generate a synthesized image using the original image and the synthesized label, wherein the synthesized image is created by combining (i) an image of the arbitrary specific object corresponding to the additional label and (ii) the original image;
(c) the learning device supporting a second CNN module to acquire the synthesized image and to generate a first output value which represents a probability as to whether the synthesized image is fake or real, and further supporting the second CNN module to acquire an arbitrary real image which has not been synthesized, and to generate a second output value which represents a probability as to whether the arbitrary real image is fake or real; and
(d) the learning device supporting the second CNN module to generate a first loss value by comparing the first output value to a first GT value, and a second loss value by comparing the second output value to a second GT value, and supporting the first and the second CNN modules to be learned by backpropagating each of the first and the second loss values through the second CNN module and the first CNN module.

2. The method of claim 1, wherein, at the step of (d), the learning device supports the first CNN module to learn parameters thereof such that a degree of making the second CNN module judge the synthesized image as real image is increased, and the second CNN module to learn parameters thereof such that a degree of correctly judging each of the arbitrary real image and synthesized image is whether real or fake is increased.

3. The method of claim 1, wherein, at the step of (a), the learning device further acquires (iii) at least a value of a random seed,
wherein, at the step of (b), the learning device supports the first CNN module to generate one or more adjusted synthesized images using the original image, the synthesized label and the value of the random seed, and
wherein each of the adjusted synthesized images is derived from the synthesized image such that at least part of a size, a location, and a color of the specific object in each of the adjusted synthesized images are adjusted from those of the specific object in the synthesized image while changing the value of the random seed.

4. The method of claim 3, wherein, the first CNN module includes;
an encoding layer for generating a feature map by applying one or more convolution operations to the original image and the synthesized label,
an adjusting layer for generating an adjusted feature map by using the feature map and the value of the random seed, and
a decoding layer for generating the synthesized image by applying one or more deconvolution operations to the adjusted feature map.

5. The method of claim 1, wherein, at the step of (a), at the time when the original image and the synthesized label are acquired, the learning device further acquires (i) information on one or more first bounding boxes corresponding to one or more objects included in the original image and (ii) information on a second bounding box corresponding to the specific object included in the synthesized label,
wherein, at the step of (b), the learning device further generates third bounding boxes on the synthesized image by using the information on the first and the second bounding boxes, and
wherein the third bounding boxes include at least one of boxes corresponding to (i) at least one of the multiple objects in the original image and (ii) the specific object in the synthesized label, or adjusted boxes that have been slightly resized or relocated based on the boxes corresponding to (i) and (ii).

6. The method of claim 5, wherein the second bounding box is generated by using minimum axis parallel rectangle.

7. The method of claim 1, wherein, at the step of (a), after a type of the specific object is selected among a plurality of data sets, the additional label is generated by sampling multiple masks corresponding to the type of the specific object.

8. The method of claim 1, further comprising a step of:
e) the learning device adding the synthesized image and the synthesized label into a database including training data sets for one of object detection and image segmentation.

9. A test method of generating at least one image data set to be used for detecting at least one obstruction in one or more autonomous driving circumstances, comprising:
(a) a testing device, on condition that (I) a learning device has acquired (i) an original image for training representing a road driving circumstance and (ii) a synthesized label for training obtained by using an original label for training corresponding to the original image for training and an additional label for training corresponding to an arbitrary specific object for training, wherein the arbitrary specific object for training does not relate to the original image for training; (II) the learning device has supported a first CNN module to generate a synthesized image for training using the original image for training and the synthesized label for training, wherein the synthesized image for training is created by combining (i) an image of the arbitrary specific object for training corresponding to the additional label for training and (ii) the original image for training, (III) the learning device has supported, a second CNN module to acquire the synthesized image for training and to generate a first output value which represents a probability as to whether the synthesized image for training is fake or real, and further has supported the second CNN module to acquire an arbitrary real image which has not been synthesized, and to generate a second output value which represents a probability as to whether the arbitrary real image is fake or real; and (IV) the learning device has supported the second CNN module to generate a first loss value by comparing the first output value to a first GT value, and a second loss value by comparing the second output value to a second GT value, and has supported the first and the second CNN modules to be learned by backpropagating each of the first and the second loss values through the second CNN module and the first CNN module, acquiring (i) an original image for testing representing a road driving circumstance and (ii) a synthesized label for testing obtained by using an original label for testing corresponding to the original image for testing and an additional label for testing corresponding to an arbitrary specific object for testing, wherein the arbitrary specific object for testing does not relate to the original image for testing; and
(b) the testing device supporting the first CNN module to generate a synthesized image for testing using the original image for testing and the synthesized label for testing,
wherein the synthesized image for testing is created by combining (i) an image of the arbitrary specific object for testing corresponding to the additional label for testing and (ii) the original image for testing.

10. The method of claim 9, wherein, at the step of (a), the testing device further acquires (iii) at least a value of a random seed for testing, wherein, at the step of (b), the testing device supports the first CNN module to generate one or more adjusted synthesized images for testing using the original image for testing, the synthesized label for testing and the value of the random seed for testing, and wherein each of the adjusted synthesized images for testing is derived from the synthesized image for testing such that at least part of a size, a location, and a color of the specific object for testing in each of the adjusted synthesized images for testing are adjusted from those of the specific object for testing in the synthesized image for testing while changing the value of the random seed for testing.

11. The method of claim 9, wherein, the first CNN module includes:

an encoding layer for generating a feature map for testing by applying one or more convolution operations to the original image for testing and the synthesized label for testing, an adjusting layer for generating an adjusted feature map for testing by using the feature map for testing and a value of a random seed for testing, and a decoding layer for generating the synthesized image for testing by applying one or more deconvolution operations to the adjusted feature map for testing.

12. The method of claim 9, wherein, at the step of (a), at the time when the original image for testing and the synthesized label for testing are acquired, the testing device further acquires (i) information on one or more first bounding boxes for testing corresponding to one or more objects included in the original image for testing and (ii) information on a second bounding box for testing corresponding to the specific object for testing included in the synthesized label for testing, wherein, at the step of (b), the learning device further generates third bounding boxes for testing on the synthesized image for testing by using the information on the first and the second bounding boxes for testing, and wherein the third bounding boxes for testing include at least one of boxes corresponding to (i) at least one of the multiple objects in the original image for testing and (ii) the specific object for testing in the synthesized label for testing, or adjusted boxes for testing that have been slightly resized or relocated based on the boxes corresponding to (i) and (ii).

13. The method of claim 12, wherein the second bounding box for testing is generated by using minimum axis parallel rectangle.

14. The method of claim 9, wherein, at the step of (a), after a type of the specific object for testing is selected among a plurality of data sets, the additional label for testing is generated by sampling multiple masks corresponding to the type of the specific object for training.

15. A device of generating at least one image data set to be used for learning CNN capable of detecting at least one obstruction in one or more autonomous driving circumstances, comprising:

a communication part for acquiring (i) an original image representing a road driving circumstance and (ii) a synthesized label obtained by using an original label corresponding to the original image and an additional label corresponding to an arbitrary specific object, wherein the arbitrary specific object does not relate to the original image;

a processor for performing a process of (I) supporting a first CNN module to generate a synthesized image using the original image and the synthesized label, wherein the synthesized image is created by combining (i) an image of the arbitrary specific object corresponding to the additional label and (ii) the original image;

(II) supporting a second CNN module to acquire the synthesized image and to generate a first output value which represents a probability as to whether the synthesized image is fake or real, and supporting the second CNN module to acquire an arbitrary real image which has not been synthesized, and to generate a second output value which represents a probability as to whether the arbitrary real image is fake or real; and (III) supporting the second CNN module to generate a first loss value by comparing the first output value to a first GT value, and a second loss value by comparing the second output value to a second GT value, and supporting the first and the second CNN modules to be learned by backpropagating each of the first and the second loss values through the second CNN module and the first CNN module.

16. The device of claim 15, wherein, at the process of (III), the processor supports the first CNN module to learn parameters thereof such that a degree of making the second CNN module judge the synthesized image as real image is increased, and the processor supports the second CNN module to learn parameters thereof such that a degree of correctly judging each of the arbitrary real image and synthesized image is whether real or fake is increased.

17. The device of claim 15, wherein the communication part further acquires (iii) at least a value of a random seed, wherein, at the process of (I), the processor supports the first CNN module to generate one or more adjusted synthesized images using the original image, the synthesized label and the value of the random seed, and wherein each of the adjusted synthesized images is derived from the synthesized image such that at least part of a size, a location, and a color of the specific object in each of the adjusted synthesized images are adjusted from those of the specific object in the synthesized image while changing the value of the random seed.

18. The device of claim 17, wherein the first CNN module includes:

an encoding layer for generating a feature map by applying one or more convolution operations to the original image and the synthesized label, an adjusting layer for generating an adjusted feature map by using the feature map and the value of the random seed, and a decoding layer for generating the synthesized image by applying one or more deconvolution operations to the adjusted feature map.

19. The device of claim 15, wherein, at the time when the original image and the synthesized label are acquired, the communication part further acquires (i) information on one or more first bounding boxes corresponding to one or more objects included in the original image and (ii) information on a second bounding box corresponding to the specific object included in the synthesized label, wherein, at the process of (I), the processor further generates third bounding boxes on the synthesized image by using the information on the first and the second bounding boxes, and wherein the third bounding boxes include at least one of boxes corresponding to (i) at least one of the multiple objects in the original image and (ii) the specific object in the synthesized label, or adjusted boxes that have been slightly resized or relocated based on the boxes corresponding to (i) and (ii).

20. The device of claim 19, wherein the second bounding box is generated by using minimum axis parallel rectangle.

21. The device of claim 15, wherein, after a type of the specific object is selected among a plurality of data sets, the additional label is generated by sampling multiple masks corresponding to the type of the specific object.

22. The device of claim 15, wherein the processor further performs a process of:
   (IV) adding the synthesized image and the synthesized label into a database including training data sets for one of object detection and image segmentation.

23. A test device of generating at least one image data set to be used for detecting at least one obstruction in one or more autonomous driving circumstances, comprising:
   a communication part, on condition that (I) a learning device has acquired (i) an original image for training representing a road driving circumstance and (ii) a synthesized label for training obtained by using an original label for training corresponding to the original image for training and an additional label for training corresponding to an arbitrary specific object for training, wherein the arbitrary specific object for training does not relate to the original image for training; (II) the learning device has supported a first CNN module to generate a synthesized image for training using the original image for training and the synthesized label for training, wherein the synthesized image for training is created by combining (i) an image of the arbitrary specific object for training corresponding to the additional label for training and (ii) the original image for training, (III) the learning device has supported, a second CNN module to acquire the synthesized image for training and to generate a first output value which represents a probability as to whether the synthesized image for training is fake or real, and further has supported the second CNN module to acquire an arbitrary real image which has not been synthesized, and to generate a second output value which represents a probability as to whether the arbitrary real image is fake or real; and (IV) the learning device has supported the second CNN module to generate a first loss value by comparing the first output value to a first GT value, and a second loss value by comparing the second output value to a second GT value, and has supported the first and the second CNN modules to be learned by backpropagating each of the first and the second loss values through the second CNN module and the first CNN module, for acquiring (i) an original image for testing representing a road driving circumstance and (ii) a synthesized label for testing obtained by using an original label for testing corresponding to the original image for testing and an additional label for testing corresponding to an arbitrary specific object for testing, wherein the arbitrary specific object for testing does not relate to the original image for testing; and
   a processor for performing a process of (I) supporting the first CNN module to generate a synthesized image for testing using the original image for testing and the synthesized label for testing,
   wherein the synthesized image for testing is created by combining (i) an image of the arbitrary specific object for testing corresponding to the additional label for testing and (ii) the original image for testing.

24. The device of claim 23, wherein the communication part further acquires (iii) at least a value of a random seed value for testing,
   wherein, at the process of (I), supports the first CNN module to generate one or more adjusted synthesized images for testing using the original image for testing, the synthesized label for testing and the value of the random seed for testing, and
   wherein each of the adjusted synthesized images for testing is derived from the synthesized image for testing such that at least part of a size, a location, and a color of the specific object for testing in each of the adjusted synthesized images for testing are adjusted from those of the specific object for testing in the synthesized image for testing while changing the value of the random seed for testing.

25. The device of claim 23, wherein the first CNN module includes:
   an encoding layer for generating a feature map for testing by applying one or more convolution operations to the original image for testing and the synthesized label for testing,
   an adjusting layer for generating an adjusted feature map for testing by using the feature map for testing and the value of the random seed for testing, and
   a decoding layer for generating the synthesized image for testing by applying one or more deconvolution operations to the adjusted feature map for testing.

26. The device of claims 23, wherein, at the time when the original image for testing and the synthesized label for testing are acquired, the communication part further acquires (i) information on one or more first bounding boxes for testing corresponding to one or more objects included in the original image for testing and (ii) information on a second bounding box for testing corresponding to the specific object for testing included in the synthesized label for testing,
   wherein, at the process of (I), the learning device further generates third bounding boxes for testing on the synthesized image for testing by using the information on the first and the second bounding boxes for testing, and
   wherein the third bounding boxes for testing include at least one of boxes corresponding to (i) at least one of the multiple objects in the original image for testing and (ii) the specific object for testing in the synthesized label for testing, or adjusted boxes for testing that have been slightly resized or relocated based on the boxes corresponding to (i) and (ii).

27. The device of claim 26, wherein the second bounding box for testing is generated by using minimum axis parallel rectangle.

28. The device of claim 23, wherein, after a type of the specific object for testing is selected among a plurality of data sets, the additional label for testing is generated by sampling multiple masks corresponding to the type of the specific object for training.

* * * * *